No. 738,923. PATENTED SEPT. 15, 1903.
D. R. LEWIS.
FLOAT FOR FISHING LINES.
APPLICATION FILED MAR. 12, 1903.

NO MODEL.

Witnesses
E. K. Reichenbach.
L. Hilton

Inventor
David R. Lewis.
By H. B. Wilson,
Attorney

No. 738,923.

Patented September 15, 1903.

UNITED STATES PATENT OFFICE.

DAVID R. LEWIS, OF MANCHESTER, IOWA.

FLOAT FOR FISHING-LINES.

SPECIFICATION forming part of Letters Patent No. 738,923, dated September 15, 1903.

Application filed March 12, 1903. Serial No. 147,478. (No model.)

*To all whom it may concern:*

Be it known that I, DAVID R. LEWIS, a citizen of the United States, residing at Manchester, in the county of Delaware and State of Iowa, have invented certain new and useful Improvements in Floats for Fishing-Lines; and I do declare the following to be a full, clear, and exact description of the invention, such as will enable others skilled in the art to which it appertains to make and use the same.

My invention relates to improvements in floats for fishing-lines; and it consists in the peculiar construction and combination of devices hereinafter described and claimed.

One object of my invention is to provide a fishing-float with improved means for attaching the same to a line and detaching the same therefrom.

A further object of my invention is to provide a fishing-float with improved means whereby it may be slidably connected to a line.

A further object of my invention is to effect improvements in the construction of the helical line-attaching wire with which the float is provided.

Figure 1:
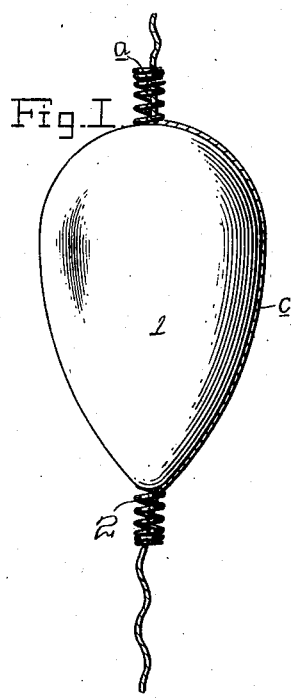
Figure 2:
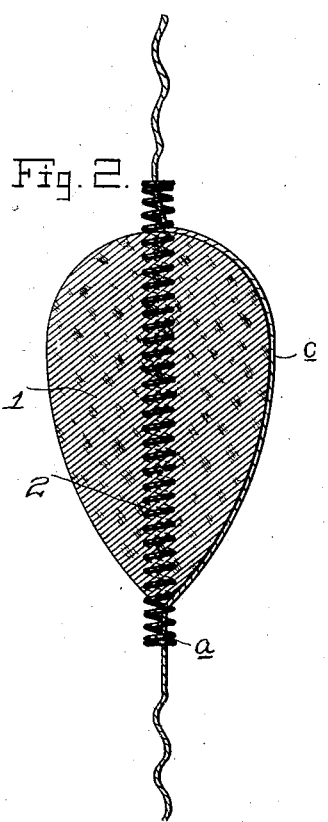
Figure 3:
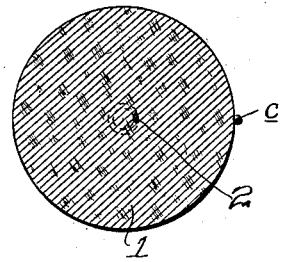
Figure 4:
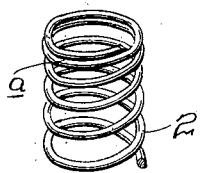

In the accompanying drawings, Figure 1 is an elevation of a float embodying my improvements, showing the same attached to a fishing-line. Fig. 2 is a sectional view of the same, showing a helical line-attaching wire having its convolutions engaged with the substance of the float. Fig. 3 is a cross-sectional view of the same. Fig. 4 is a detail perspective view on a larger scale, showing the construction of the projecting end portion of the helical line-attaching wire, with its outermost convolutions in mutual engagement. In the embodiment of my invention the float 1 may be of any suitable size and shape and is composed of compressible material, cork being a suitable compressible material for this purpose. Within the scope of my invention any other compressible material may be used in the construction of the float, and I do not desire to limit myself in this particular.

Through the float is passed a helical line-attaching wire 2, which is here shown as extending longitudinally through the float. The end portions of the said helical line-attaching wire project outwardly from the float in opposite directions and the convolutions of that portion of the helical line-attaching wire which is in the float are engaged with the substance of the latter—that is to say, the helical line-attaching wire is screwed through the float, its convolutions displacing the substance of the float and forming a helical bore therein, so that the convolutions of the line-attaching wire are embedded in the substance of the float, whereby the line-attaching wire is so firmly connected to the float that it cannot be drawn therefrom. The outermost convolutions of the projecting end portions of the line-attaching wire are in mutual contact, as at $a$.

In attaching the float to the line C the latter is wound spirally in the projecting end portions of the helical line-attaching wire, so that the line becomes disposed longitudinally in said projecting end portions of the helical wire, and thereby the float is slidably connected to the line, so that it may be readily adjusted thereon as may be desired. The least tension of the line, however, will cause the looped portion of the line, which is in contact with one side of the float, to create so much friction as to effectually prevent casual displacement of the float on the line after it has been appropriately adjusted. It will be understood that by turning the float in the appropriate direction with relation to the looped portion of the line the float may be detached from the line. The outermost coils of the projecting end portions of the wire are closed, so that they are in mutual engagement, or practically so, to prevent the casual detachment of the float from the line, the closely associated or compressed end convolutions preventing the line from passing between them under ordinary conditions.

Having thus fully described my invention, what I claim as new, and desire to secure by Letters Patent of the United States, is—

1. A float having a helical line-attaching wire passed therethrough, and with its convolutions engaged therewith, the ends of said helical attaching-wire projecting from the float, substantially as described.

2. A float having a helical line-attaching wire passed therethrough and with its convolutions engaged therewith, the end portions of said attaching-wire projecting from the float and having their outermost convolutions in mutual engagement, substantially as described.

3. A float of compressible material, having a helical line-attaching wire passed therethrough and with its convolutions engaged therewith, said wire having line-attaching devices at its ends, substantially as described.

4. A float having a helical line-attaching wire passed therethrough and with its convolutions engaged therewith, the ends of the wire projecting from the float and having line-attaching devices, substantially as described.

In testimony whereof I have hereunto set my hand in presence of two subscribing witnesses.

DAVID R. LEWIS.

Witnesses:
J. P. WILSON,
R. W. TIRRILL.